US012722673B2

(12) United States Patent
Merry

(10) Patent No.: US 12,722,673 B2
(45) Date of Patent: Sep. 1, 2026

(54) SYSTEMS AND METHODS FOR MONITORING AND VALIDATING STATUS OF WHEEL DETECTOR DEVICES IN A CLASSIFICATION YARD

(71) Applicant: BNSF Railway Company, Fort Worth, TX (US)

(72) Inventor: Nathaniel W. Merry, Kansas City, MO (US)

(73) Assignee: BNSF Railway Company

( * ) Notice: Subject to any disclaimer, the term of this patent is extended or adjusted under 35 U.S.C. 154(b) by 37 days.

(21) Appl. No.: 18/658,654

(22) Filed: May 8, 2024

(65) Prior Publication Data

US 2025/0346265 A1 Nov. 13, 2025

Related U.S. Application Data

(63) Continuation-in-part of application No. 18/658,386, filed on May 8, 2024.

(51) Int. Cl.

| | |
|---|---|
| ***B61L 25/02*** | (2006.01) |
| ***G07C 5/04*** | (2006.01) |
| ***G07C 5/08*** | (2006.01) |

(52) U.S. Cl.

CPC .............. *B61L 25/021* (2013.01); *G07C 5/04* (2013.01); *G07C 5/0816* (2013.01)

(58) Field of Classification Search

CPC ........ B61L 25/021; G07C 5/04; G07C 5/0816

See application file for complete search history.

(56) References Cited

U.S. PATENT DOCUMENTS

| | | | |
|---|---|---|---|
| 3,601,605 | A | 8/1971 | Elder |
| 3,745,334 | A | 7/1973 | Wong et al. |

(Continued)

FOREIGN PATENT DOCUMENTS

| | | | |
|---|---|---|---|
| EP | 3745334 | A1 | 2/2024 |
| GE | 940060 | A1 | 11/1995 |

(Continued)

OTHER PUBLICATIONS

M. Malvezzi, P. Toni, B. Allotta and V. Colla, "Train speed and position evaluation using wheel velocity measurements, " 2001 IEEE/ASME International Conference on Advanced Intelligent Mechatronics. Proceedings (Cat. No. 01TH8556), Como, Italy, 2001, pp. 220-224 vol. 1, doi: 10.1109/AIM.2001.936457. (Year: 2001).*

(Continued)

*Primary Examiner* — Brian P Sweeney

(74) *Attorney, Agent, or Firm* — Enrique Sanchez, Jr.; Juan J Vasquez

(57) ABSTRACT

Methods and systems for determining a status of detectors in a classification yard. In particular embodiments, a set of car event data associated with a detector may be analyzed to determine the performance of the detector during operations of each car event. A status of the detector may be determined from the analysis of the performance of the detector during operations of each car event. In embodiments, the analysis may include thresholding analysis that may be configured to determine a relationship (e.g., a deviation relationship) between real-world speeds measured during the car events and predicted speeds expected during the car events for each car event associated with the detector. In embodiments, the status of the detector may be used to ensure corrective actions on the detector (e.g., deploy maintenance personnel, (Continued)

report the status of the detector, send a control signal to the detector to deactivate, etc.).

17 Claims, 4 Drawing Sheets

(56) References Cited

U.S. PATENT DOCUMENTS

| | | | |
|---|---|---|---|
| 4,151,969 | A | 5/1979 | Wood |
| 6,216,525 | B1 | 4/2001 | Bernd |
| 8,499,900 | B1 | 8/2013 | Heyden |
| 8,560,151 | B2 | 10/2013 | Armitage et al. |
| 8,655,540 | B2 | 2/2014 | Mian et al. |
| 9,415,513 | B2 | 8/2016 | Tian et al. |
| 9,714,043 | B2 | 7/2017 | Mian et al. |
| 9,945,652 | B2 | 4/2018 | Mian et al. |
| 10,597,053 | B2 | 3/2020 | Mian et al. |
| 10,906,571 | B2 | 2/2021 | Mian |
| 2007/0106434 | A1 | 5/2007 | Galbraith et al. |
| 2007/0298570 | A1 | 12/2007 | Parekh |
| 2008/0119973 | A1 | 5/2008 | Pathak |
| 2008/0173771 | A1 | 7/2008 | Kiss |
| 2008/0304065 | A1 | 12/2008 | Hesser |
| 2014/0110534 | A1* | 4/2014 | Bartonek ................. B61K 9/12 246/169 R |
| 2014/0137762 | A1 | 5/2014 | Dierkes |
| 2020/0011282 | A1 | 1/2020 | Wakasugi |
| 2023/0303136 | A1 | 9/2023 | Braatz |
| 2023/0331265 | A1 | 10/2023 | Braatz |
| 2024/0185643 | A1 | 6/2024 | Joo |
| 2024/0308555 | A1 | 9/2024 | Malde |
| 2024/0317285 | A1 | 9/2024 | Malde |

FOREIGN PATENT DOCUMENTS

| | | | |
|---|---|---|---|
| JP | 2010098849 | A | 4/2010 |
| WO | 2004110845 | A1 | 12/2004 |

OTHER PUBLICATIONS

Hongfei Li, et al., Improving rail network velocity: A machine learning approach to predictive maintenance, Aug. 1, 2014.

Weixin Wang, et al., Joint Prediction of remaining useful life and failure type of train wheelsets: a multi-task learning approach, Jan. 10, 2021.

Zaharah Allah Bukhsh, et al., Predictive maintenance using tree-based classification techniques: A case of railway switches, Apr. 1, 2019.

* cited by examiner

SYSTEMS AND METHODS FOR MONITORING AND VALIDATING STATUS OF WHEEL DETECTOR DEVICES IN A CLASSIFICATION YARD

CROSS-REFERENCE TO RELATED APPLICATIONS

The present application is a Continuation-in-Part of U.S. patent application Ser. No. 18/658,386, filed on May 8, 2024, the entirety of which is herein incorporated by reference for all purposes.

TECHNICAL FIELD

The present invention relates generally to maintenance monitoring systems, and more particularly to tools for monitoring and validating the status of wheel detector devices in a classification yard.

BACKGROUND

Innovation in the railroad industry has allowed for widespread and efficient transportation of freight and passengers across distances using trains. A typical train may include one or more locomotive engines that may be configured to pull and/or push one or more train cars. The trains may be put together or assembled in a classification yard, which may include a hump yard. A hump yard may refer to an area configured to route the train cars along a network of marshalling tracks using gravity to respectively-assigned trains. In this manner, the hump yard may enable operators to assemble trains by routing the train cars to their assigned train. Typically, hump yards consist of an elevated area (e.g., a hump, which may be artificial or natural, such as a hill, mound, etc.) along which a track section is run. The track section may include an approach section, a top of the hump or crest, and a release area, which typically branches out into multiple marshalling tracks. Each of the marshalling tracks may eventually lead to a destination train to which the various train cars may be routed using the marshalling tracks.

In typical operations of a hump yard, a rolling stock train including the train cars to be marshalled to their assigned train may be pushed by a hump push engine at a set speed along the approach section to the crest of the hump. As the train cars roll past the apex (e.g., the crest) of the hump, gravity may begin pulling the railroad cars towards the bottom of the hump causing individual railroad cars, or groups of railroad cars, also referred to as a cut, to separate from the stock train and to coast to the release area at a release speed. The separated railroad cars, or cut, may coast (and may decelerate or accelerate depending on the layout of the marshalling tracks) through the marshalling tracks to reach the coupling point at their respectively assigned train. The operations continue with additional cuts being routed through the hump yard marshalling tracks as appropriate or necessary. Once the train is fully assembled, the train is pulled out of the marshalling tracks and eventually travels to its destination.

In a hump yard, controlling the movement of a cut as it travels through the marshalling tracks is exceedingly important. For example, controlling the route of each cut is important to ensure that each cut is routed to the respectively assigned destination train, to avoid potential collisions between the various cuts, and/or to load-balance the use of the marshalling tracks as the cuts are released onto the marshalling tracks.

Additionally, controlling the speed of each cut as it travels through the marshalling tracks is important in order to avoid accidental damage to equipment, train cars, and/or the freight itself. For example, an overly high coupling speed may cause the cut to couple with the destination train at a high speed and may cause damage to the existing train cars (e.g., the train cars already coupled to the destination train), to itself, or to the freight (e.g., the freight being carried by one or more of the train cars in the cut or the freight in the existing train cars of the destination train), whereas an overly low release speed may not be sufficient to ensure that the cut reaches the coupling point, as the only source of power to the cut during the marshalling process is gravity and as such, the cut is not able to accelerate beyond what gravity provides. In addition, controlling the speed of each cut as it travels through the marshalling tracks is important to ensure that the separation between the various cuts is sufficient to avoid collisions between cuts. Ensuring an appropriate separation between cuts may also ensure that any switches in the route of the cuts may be reset in time to marshal the next cut to the appropriate train. For example, if two consecutive cuts assigned to different marshalling tracks are released from the top of the hump too close together, there may not be sufficient time to reset the switch after the first cut is diverted to its respective marshalling track to ensure that the second cut is diverted to the appropriate marshalling track.

In typical implementations of a classification yard, various mechanisms and hardware devices are implemented to control the route and/or speed of the various cuts as these various cuts travel through the marshalling tracks of the classification yard. Typical implementations include switches that may be configured to route a cut to a target track, detectors (e.g., wheel detectors) that may be configured to detect the speed of a cut, and/or retarders that may be configured to remove energy from a cut. A typical switch operates by routing a cut from a source track into one of a plurality of destination tracks. For example, a switch may be connected to a single source track and a plurality of destination tracks. A signal may be configured the throw the switch to a selected track of the plurality of destination tracks, in which case a cut traveling over the source track may be automatically routed to the selected destination track. Typical retarders operate by slowing down a train car as it traverses over the retarder. A typical retarder applies a pressure against one or more wheels of a train car (e.g., using a braking element, such as a brake pad, etc.), which may cause the train car to slow down. Put another way, the retarder may remove energy (e.g., kinetic energy) of the train car as it moves through a marshalling track, which may cause the train car to slow down. The amount of energy, or speed, removed from a cut by a retarder may depend on the amount of pressure applied by the retarder. For example, a higher pressure may cause more energy, or speed, to be removed from a cut than a lower pressure. In this manner, retarders may be used to further control the speed of a cut as it travels through the marshalling tracks.

A typical detector (e.g., a wheel detector) may be configured to detect a speed and/or arrival time of a cut at the detector. For example, a detector may be configured to detect the presence of a wheel (e.g., a wheel of a cut) at the detector. The detector may generate a wheel detection with a time associated with the detection. In implementations, a detector may detect the speed of a cut by detecting the presence of a first wheel of the cut at a first time, detecting the presence of a second wheel of the cut at a second time, and determining a speed from the difference between the first and second times over the distance between the first wheel and the second wheel. In this manner, a detector may be used to measure the speed of a cut at the detector.

However, hardware devices, such as detectors, are subject to wear down and degradation over time and usage, in addition to exposure to environmental factors. As time passes by, the performance of the various hardware devices may deteriorate and the efficiency or effectiveness of the various devices may degrade. In addition, detectors may be subject to failures, such as due to mechanical, electrical, software failures, etc. As many of these hardware devices include mechanical operations, the hardware devices may bind, break, bend, or otherwise may experience failure events. This may cause operations of the classification yard that rely on the operations of the hardware devices to also fail, or to suffer degradation. For example, predictions that rely upon detectors may become inaccurate, which may affect classification operations. In some cases, detectors may operate slower than expected, which may cause problems in the operations of the classification yard. In some cases, detectors may fail due to degradation and may fail to detect an accurate speed of a cut. For example, the calculation of a speed of a cut based on the difference between a first detection time and a second detection time over the distance between the first wheel and the second wheel may not reflect the actual speed of the cut. In this case, the poor operations of a defective detector may cause problems with operations that rely on accurate speed measurements (e.g., speed and/or arrival time predictions).

Currently, determining a status of a detector may include manual inspections of the detector. However, this presents a great burden on operators, and may become very expensive due to the number of detectors used in classification yards. In some cases, software tools may be used to determine the status of detectors. However, current tools may not be able to effectively determine the status of detectors before problems occur due to the complexity of the detector operations.

SUMMARY

The present disclosure achieves technical advantages as systems, methods, and computer-readable storage media that provide functionality for determining a status of detector devices in railroad operations (e.g., a classification yard). In particular embodiments, a set of car event data associated with a detector device may be analyzed to determine the performance of the detector for detecting a speed of a cut during operations of the classification yard. A status of the detector may be determined from analysis of the performance of the detector to determine the performance of the detector for detecting a speed of a cut during operations of the classification yard. In embodiments, the status of the detector may be used to ensure corrective actions on the detector are taken (e.g., deploy maintenance personnel, report the status of the retarder, send a control signal to the retarder to deactivate, etc.).

The present disclosure provides for a system integrated into a practical application with meaningful limitations as a system with functionality for determining a status of detector devices that are used for controlling operations of a classification yard. In embodiments, determining the status of detectors may be critical to operations in a classification yard, as detectors wear down and degrade over time. As detectors degrade, the performance of the detectors may not be the same. In some cases, predictions, control signals, activation signals, tracking signals, etc., associated with planning, controlling, tracking, reporting operations of a classification yard that rely on speed measurements from detectors may be affected as these operations may not be based on accurate information or may not be executed correctly, which may cause operational problems. The present disclosure provides features that may be used by a system to monitor, track, and/or control the performance of a detector for measuring the speed of cuts passing through the detector. In embodiments, features described herein may allow a system to generate alert and/or control signals that may be used by field personnel to perform corrective actions on the detector or may be used by the system to send automatic control signals to deactivate or adjust a defective or degraded detector.

The present disclosure solves the technological problem of a lack of functionality in current systems to dynamically monitor, track, and/or control the performance of detectors for detecting a speed of cuts passing through the detectors during operations of the classification yard. For example, in current systems, a bad or degraded detector may not be identified until it is too late (e.g., after the detector has failed), which may result in catastrophic (e.g., may cause injury to persons, damage to equipment, and/or impact to services) and/or expensive consequences. A system implemented in accordance with the present disclosure may be flexible and responsive to these situations may identify these bad/defective/degraded detectors, even when the problem may be masked by control software compensating. The technological solutions provided herein, and missing from conventional systems, are more than a mere application of a manual process to a computerized environment, but rather include functionality to implement a technical process to replace or supplement current manual solutions or non-existing solutions for determining the status of detectors. In doing so, the present disclosure goes well beyond a mere application of the manual process to a computer. Accordingly, the claims herein necessarily provide a technological solution that overcomes a technological problem.

It is further noted that the embodiments described herein focus and/or are described in the context of operations of a classification yard. However, this is not intended to be limiting, as the techniques disclosed herein are also applicable in other railroad operations that may not involve a classification yard. For example, the techniques disclosed herein may be used to determine a status of hardware devices that are used for controlling railroad operations that may not be part of a classification yard. In this case, the embodiments herein should be construed as exemplary, and not limiting in any way. Moreover, although specific and particular hardware devices may be described herein, this is also not intended to be limiting, and it should be understood that the techniques disclosed herein to determine a status of hardware devices may be used to determine that status of any hardware device that may be used in any operation related to hardware (and not limited to classification yard operations of specific devices mentioned herein).

In various embodiments, the system comprises one or more processors interconnected with a memory module, capable of executing machine-readable instructions. These instructions include, but are not limited to, the steps outlined in any flow diagram, system diagram, block diagram, and/or process diagram disclosed herein, as well as steps corresponding to any functionality detailed herein. In embodiments, the execution of these machine-readable instructions may involve initiating multiple concurrent computer processes. Each process of the concurrent computer process may be configured to handle or process a designated subset or portion of the of the machine-readable instructions. This division of tasks enables parallel processing, multi-processing, and/or multi-threading, enabling multiple operations to be conducted or executed concurrently rather than sequentially. This functionality for spawning a plurality of concurrent processes to manage separate portions of the machine-readable instructions markedly increases the overall speed of execution of the machine-readable instructions. By leveraging parallel or concurrent processing, the time required to complete a set or subset of program steps is substantially reduced (e.g., when compared to execution without concurrent or parallel processing). This efficiency gain not only accelerates the processing speed but also optimizes the use of processor resources, leading to an improved performance of the computing system. This enhancement in computational efficiency constitutes a significant technological improvement, as it enhances the functional capabilities of the processors and the system as a whole, representing a practical and tangible technological advancement. The result of this concurrent processing functionality results in an improvement in the functioning of the one or more processor and/or the computing system, and thus, represents a practical application.

In embodiments, the present disclosure includes techniques for training models (e.g., machine-learning models, artificial intelligence models, algorithmic constructs, etc.) for performing or executing a designated task or a series of tasks (e.g., one or more features of steps or tasks of processes, systems, and/or methods disclosed in the present disclosure). The disclosed techniques provide a systematic approach for the training of such models to enhance performance, accuracy, and efficiency in their respective applications. In embodiments, the techniques for training the models may include collecting a set of data from a database, conditioning the set of data to generate a set of conditioned data, and/or generating a set of training data including the collected set of data and/or the conditioned set of data. In embodiments, that model may undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into a practical application that significantly enhance the functionality, reliability, and efficiency of the models developed through these processes.

In embodiments, the present disclosure includes techniques for generating a notification of an event that includes generating an alert that includes information specifying the location of a source of data associated with the event, formatting the alert into data structured according to an information format, and/or transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea. These features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter.

In embodiments, one or more operations and/or functionality of components described herein can be distributed across a plurality of computing systems (e.g., personal computers (PCs), user devices, servers, processors, etc.), such as by implementing the operations over a plurality of computing systems. This distribution can be configured to facilitate the optimal load balancing of traffic (e.g., requests, responses, notifications, etc.), which can encompass a wide spectrum of network traffic or data transactions. By leveraging a distributed operational framework, a system implemented in accordance with embodiments of the present disclosure can effectively manage and mitigate potential bottlenecks, ensuring equitable processing distribution and preventing any single device from shouldering an excessive burden. This load balancing approach significantly enhances the overall responsiveness and efficiency of the network, markedly reducing the risk of system overload and ensuring continuous operational uptime. The technical advantages of this distributed load balancing can extend beyond mere efficiency improvements. It introduces a higher degree of fault tolerance within the network, where the failure of a single component does not precipitate a systemic collapse, markedly enhancing system reliability. Additionally, this distributed configuration promotes a dynamic scalability feature, enabling the system to adapt to varying levels of demand without necessitating substantial infrastructural modifications. The integration of advanced algorithmic strategies for traffic distribution and resource allocation can further refine the load balancing process, ensuring that computational resources are utilized with optimal efficiency and that data flow is maintained at an optimal pace, regardless of the volume or complexity of the requests being processed. Moreover, the practical application of these disclosed features represents a significant technical improvement over traditional centralized systems. Through the integration of the disclosed technology into existing networks, entities can achieve a superior level of service quality, with minimized latency, increased throughput, and enhanced data integrity. The distributed approach of embodiments can not only bolster the operational capacity of computing networks but can also offer a robust framework for the development of future technologies, underscoring its value as a foundational advancement in the field of network computing.

To aid in the load balancing, the computing system of embodiments of the present disclosure can spawn multiple processes and threads to process data traffic concurrently. The speed and efficiency of the computing system can be greatly improved by instantiating more than one process or thread to implement the claimed functionality. However, one skilled in the art of programming will appreciate that use of a single process or thread can also be utilized and is within the scope of the present disclosure.

It is an object of the disclosure to provide a system for determining a status of detector devices in a classification yard. It is a further object of the disclosure to provide a method of determining a status of detector devices in a classification yard, and a computer-based tool for determining a status of detector devices in a classification yard. These and other objects are provided by the present disclosure, including at least the following embodiments.

In one particular embodiment, a method of determining a status of detector devices in a classification yard is provided. The method includes compiling a plurality of car events associated with a detector device in the classification yard. In embodiments, each car event of the plurality of car events may be associated with a predicted speed of a cut passing through the detector device during a respective car event, and each car event may include real-world measurements of an actual speed of the cut at the detector device during the respective car event. The method also includes generating a set of speed differences associated with the detector based on the plurality of car events associated with the detector, applying thresholding analysis to the set of speed differences associated with the detector to determine a status of the detector, and generating a corrective action signal including an indication of the status of the detector and/or a corrective action to be taken on the detector.

In another embodiment, a system for determining a status of detector devices in a classification yard is provided. The system comprises at least one processor and a memory operably coupled to the at least one processor and storing processor-readable code that, when executed by the at least one processor, is configured to perform operations. The operations include compiling a plurality of car events associated with a detector device in the classification yard. In embodiments, each car event of the plurality of car events may be associated with a predicted speed of a cut passing through the detector device during a respective car event, and each car event may include real-world measurements of an actual speed of the cut at the detector device during the respective car event. The operations also include generating a set of speed differences associated with the detector based on the plurality of car events associated with the detector, applying thresholding analysis to the set of speed differences associated with the detector to determine a status of the detector, and generating a corrective action signal including an indication of the status of the detector and/or a corrective action to be taken on the detector.

In yet another embodiment, a computer-based tool for determining a status of detector devices in a classification yard is provided. The computer-based tool including non-transitory computer readable media having stored thereon computer code which, when executed by a processor, causes a computing device to perform operations. The operations include compiling a plurality of car events associated with a detector device in the classification yard. In embodiments, each car event of the plurality of car events may be associated with a predicted speed of a cut passing through the detector device during a respective car event, and each car event may include real-world measurements of an actual speed of the cut at the detector device during the respective car event. The operations also include generating a set of speed differences associated with the detector based on the plurality of car events associated with the detector, applying thresholding analysis to the set of speed differences associated with the detector to determine a status of the detector, and generating a corrective action signal including an indication of the status of the detector and/or a corrective action to be taken on the detector.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1:
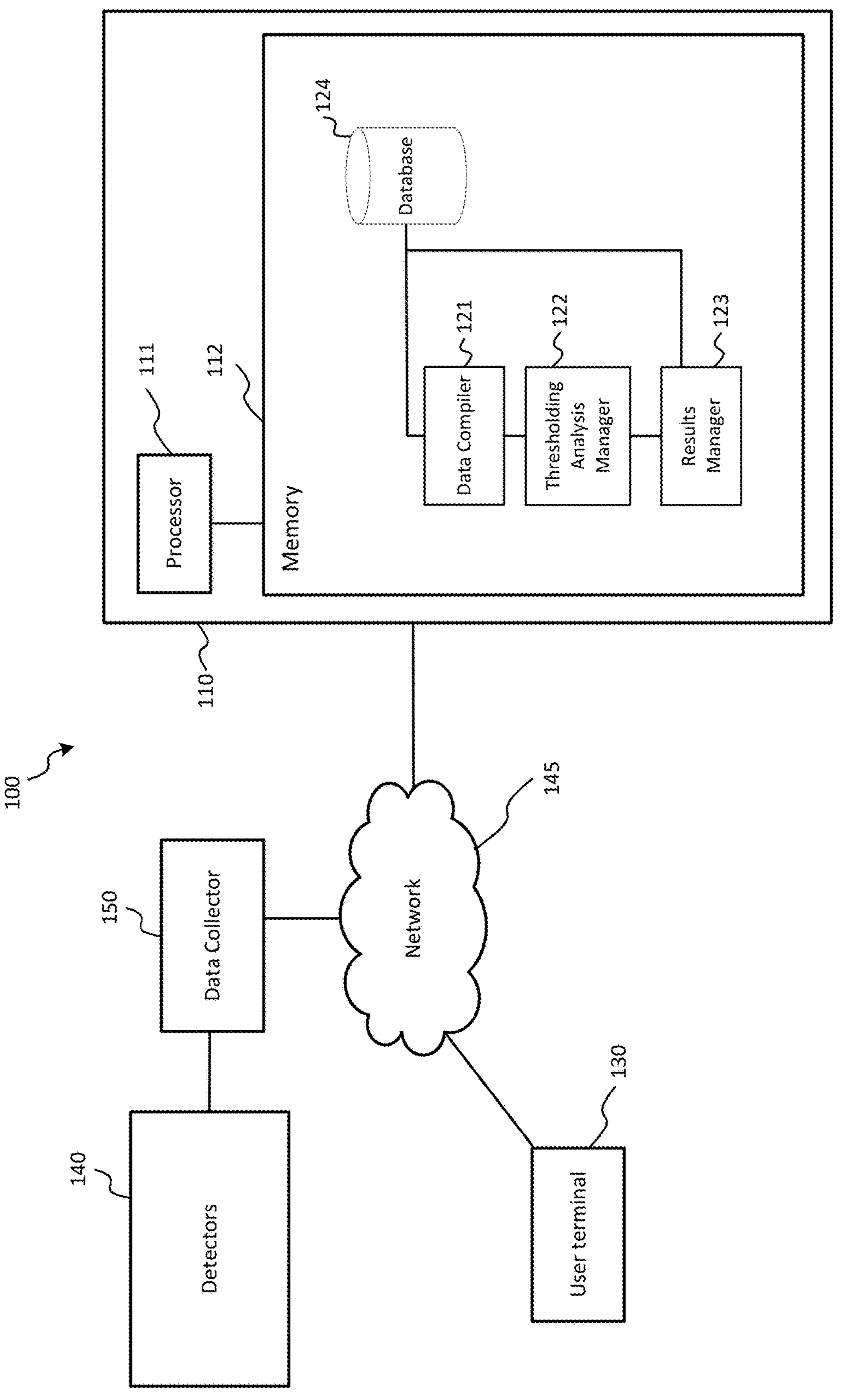
FIG. 1 is a block diagram of an exemplary system configured with capabilities and functionality for determining a status of detector devices in a classification yard in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

Various embodiments of the present disclosure are directed to systems and techniques that provide functionality for determining a status of detector devices in a classification yard. In particular embodiments, a set of car event data associated with a detector may be analyzed to determine the performance of the detector to measure speed and/or arrival times of cuts passing through the detector. A status of the detector may be determined from analysis of the performance of the detector to measure speed and/or arrival times of cuts passing through the detector. In embodiments, the status of the detector may be used to ensure corrective actions is taken on the detector (e.g., deploy maintenance personnel, report the status of the detector, send a control signal to the detector to deactivate, etc.).

FIG. 1 is a block diagram of an exemplary system 100 configured with capabilities and functionality for determining a status of detector devices in a classification yard in accordance with embodiments of the present disclosure. As shown in FIG. 1, system 100 may include server 110, detectors 140, data collector 150, user terminal 130, and network 145. These components, and their individual components, may cooperatively operate to provide functionality in accordance with the discussion herein. For example, in operation according to embodiments, detectors 140 may operate to detect speed and/or arrival times of cuts passing through detectors 140. For example, for each of a plurality of cuts passing through detectors 140, a prediction may be made regarding the speed and/or arrival time of each cut at detectors 140. In embodiments, detectors 140 may operate to detect the speed and/or arrival time of each of the plurality of cuts during the respective car events. In embodiments, data collector 150 may operate to collect real-world measurements of the speed and/or arrival time associated with the plurality of cuts traveling through detectors 140. For example, a car event may be generated for each cut passing through detectors 140. In this manner, a car event may represent a cut passing through detectors 140. In embodiments, a car event may include real-world measurements associated with the cut passing through a detector, and may include a measured speed at the detector (e.g., the actual speed of a cut at the detector during the car event), a predicted speed (e.g., the predicted or expected speed of the cut at the detector for the car event), an identification of the cut associated with the car event, an identification of the detector for which the car event was generated, and/or other conditions associated with the car event (e.g., weather, type of train cars in the cut, type of bearings of the cut, identification of the cut, etc.).

In embodiments, functionality of server 110 may provide for determining, based on car events associated with a detector, a status of the detector. In embodiments, server 110 may include functionality for determining, based on car events associated with a detector, a status of the detector by compiling data related to car events associated with the detector, applying threshold analysis to the compiled data to determine a relationship between real-world measurements and expected (e.g., predicted or desired) results with respect to operation of the detector, to determine a status of the detector based on the thresholding analysis, and to generate a corrective action signal in response to the determination of the status of the detector. In embodiments, the thresholding analysis may include analysis that focuses on the relationship between real-world measurements and expected (e.g., predicted or desired) results for each car event associated with a detector. In some embodiments, the thresholding analysis may include applying one or more rules that may determine the amount and/or spread of deviations between the real-world measurements for determining the status of a detector. In some embodiments, the thresholding analysis may include determining, for each car event associated with a detector, a speed difference between a predicted speed and the actual speed (e.g., actual speed-predicted speed), and analyzing the relationship of the speed differences against thresholds to determine the status of the detector.

It is noted that the functional blocks, and components thereof, of system 100 of embodiments of the present invention may be implemented using processors, electronics devices, detectors, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

As noted above, in typical operations of a classification yard, such as a hump yard, a stock train that includes train cars to be marshalled to their assigned train may be pushed by a hump push engine at a set speed along the approach section of the hump to the crest of the hump. As the train cars roll past the hump crest, gravity may begin pulling the train cars towards the bottom of the hump. In embodiments, the train cars are "cut" from the stock train and the cut is allowed to roll down the hump and is marshalled to the destination train. Ensuring that the cut reaches the assigned destination train at the appropriate coupling speed is very important. As such, in embodiments, a cut may be tracked and controlled as the cut moves along the marshalling tracks of the classification yard. In particular, the route and the speed of the cut from the hump to its destination track or train may be controlled using various components of the classification yard. For example, classification yard may implement switches, detectors, and retarders, among other components. In embodiments, the cooperative operation of the various components of the classification yard may enable the classification yard to ensure that various cuts traverse the marshalling tracks and arrive at the destination coupling point at the appropriate coupling speed.

In embodiments, detectors 140 may include one or more detectors configured to detect a speed of a cut. In embodiments, detectors 140 may be laid out at different points along the tracks of the classification yard. In this manner, detectors 140 may be configured to detect the speed of a cut at various points along the route of the cut through the marshalling tracks of the classification yard.

In embodiments, detectors 140 may be configured to detect the presence of a cut at various points along the route of the cut through the marshalling tracks of the classification yard. For example, as a cut passes through a detector a particular time, the detector may detect the presence of the cut at the particular time, and may generate a detection, including an identification of the cut, a timestamp indicating date/time of the detection, the location of the detection (e.g., an identification of the detector), etc.

In some embodiments, detectors 140 may include one or more detectors configured to detect one or more wheels, or wheel axles (e.g., one or more wheels, or wheel axles, of a train car, or of a cut, passing through the one or more detectors). In embodiments, detectors 140 may detect more than one wheel (or wheel axle) of the train car, or cut, passing through detectors 140. For example, a train car passing through a detector may include multiple wheel axles. In this case, the detector may be configured to detect one or more of the multiple wheel axles, and in some embodiments may identify the wheel axle detected. For example, for a train car including four wheels, the detector may identify that a detection includes detection of wheel three of four, when the detector detects the third wheel in the train car. In another example, for a cut traveling through the detector that includes two train cars each including four wheels, the detector may identify that a detection includes detection of wheel five of eight, when the detector detects the fifth wheel in the cut. In some embodiments, the wheel detector may detect more than one wheel.

In some embodiments, detectors 140 may detect a speed of a cut by detecting multiple wheels of the cut, measuring the time between the detections, and calculating a speed based, at least in part, on the characteristics of the cut. For example, a cut may travel through a detector of detectors 140. The detector may detect a first wheel of the cut at a first time. A first detection of a first wheel of the cut may be generated with a timestamp equal to the first time. The detector may detect a second wheel of the cut at a second time. A second detection of the second wheel of the cut may be generated with a timestamp equal to the second time. In embodiments, the speed of the cut may be calculated by comparing the first and the second time, and determining a speed based on the distance between the first and the second wheel, which may be a known characteristic of the cut. For example, the distance between the first and second wheel traveled by cut over the difference between the first and second detection times may provide the speed of the cut over the detector.

In some embodiments, detectors 140 may detect a speed of a cut by detecting a cut at multiple detectors and measuring the time between the detections. For example, a cut may travel through a route along the classification yard and may pass a first detector of detectors 140 at a first time. The first detector may detect the cut (e.g., a wheel of the cut) at the first time. A first detection of the cut may be generated with a timestamp equal to the first time. The cut may continue travelling through the route and may pass a second detector of detectors 140 at a second time. The second detector may detect the cut (e.g., a wheel of the cut) at the second time. A second detection of the cut may be generated with a timestamp equal to the second time. In embodiments, the speed of the cut may be calculated by comparing the first and the second time, and determining a speed based on the distance between the first and the second detector, which may be a known characteristic of detectors 140. For example, the distance between the first and second detector traveled by cut over the difference between the first and second detection times may provide the speed of the cut between the first and second detectors.

In embodiments, the components of classification yard 140 may include occupancy devices that may include track circuits, light detectors, presence detectors, etc., and may be configured to detect occupancy of a track and/or track segment, such as to detect a presence of a vehicle within the track and/or track segment. In some embodiments, occupancy devices may be configured to detect when a track or track segment has been filled to a safe capacity, which may enable a system to prevent overfilling of the track or track segment. In embodiments, occupancy devices may be used in long sections of track that may not include a wheel detector, a retarder, etc. In embodiments, an occupancy device may be configured with predicted on and off times. If the on and off times are exceeded, a segment protected by the occupancy device may be temporarily protected and if the condition persists, the protection may remain. In embodiments, protecting a track or track segment may include routing away from the protected track or track segment, such as in response to a determination that sufficient time exists to route the vehicle away from the protected track or track segment. However, the railroad vehicle may be routed into the protected track segment (e.g., to prevent a side-swipe) in response to a determination that there is not sufficient time to route the vehicle away from the protected track or track segment.

Data collector 150 may be configured to capture and store (e.g., in a database, such as database 124) car event data related to car events associated with detectors (e.g., the various detectors of the classification yard). In embodiments, during operations, predictions of the speed and/or arrival times of a cut at a detector (e.g., a detector of detectors 140) may be made during classification operations of a classification yard. For example, a production prediction manager may generate production predictions (e.g., using control parameters including tuning coefficients, characteristics of the cut, characteristics of the track or device, etc.) of a speed and/or arrival times of a cut at a particular detector. In embodiments, the production predictions may include production predictions for a plurality of cuts scheduled to be classified through the classification yard and for many detectors of the classification yard.

In embodiments, as a car event occurs (e.g., as cut passes through a detector), real-world measurements related to the car event at the detector may be generated and may be captured by data collector 150. The captured real-world measurements related to the car event at the detector may be included into the car event associated with the detector. In embodiments, a car event associated with a detector may include an actual speed of the cut as it passed through the detector, and may also include the predicted speed for the cut (e.g., the speed at which the cut was predicted to pass at the detector for the car event). In embodiments, data collector 150 may store the car events associated with a detector into a database (e.g., database 124) for subsequent analysis.

User terminal 130 may include a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user terminal 130 may provide a user interface that may be configured to provide an interface (e.g., a graphical user interface (GUI)) structured to facilitate an operator interacting with system 100, e.g., via network 145, to execute and leverage the features provided by server 110. In embodiments, the operator may be enabled, e.g., through the functionality of user terminal 130, to provide configuration parameters that may be used by system 100 to provide functionality for determining the status of detectors, as well as to interact with results (e.g., selection, confirmation, verification of results, etc.). In embodiments, user terminal 130 may be configured to communicate with other components of system 100. In embodiments, the functionality of user terminal 130 may include presenting results of detector status determination operations to an operator. In embodiments, the results of detector status determination operations may be presented to an operator via the GIU of user terminal 130.

In embodiments, server 110, classification yard 140 (and its various components), and user terminal 130 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Server 110 may be configured to facilitate operations for determining a status of detectors in a classification yard in accordance with embodiments of the present disclosure. In embodiments, functionality of server 110 to facilitate determination of a status of detectors in a classification yard may be provided by the cooperative operation of the various components of server 110, as will be described in more detail below.

Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 124, data compiler 121, thresholding analysis manager 122, and results manager 123. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 124 for storing various information related to operations of system 100. For example, database 124 may store analysis models, threshold data, configuration information, etc., to be used for configuring system 100, etc. In embodiments, database 124 may store characteristics of various and different train cars, such as rolling resistance characteristics, weights, aerodynamic characteristics (e.g., drag coefficient, coupler overhang status, articulation status of the etc. In embodiments, database 124 may store car event data related to speed, energy, and/or arrival times measurements of various cuts at various points (e.g., devices and/or segments) of the classification yard.

Database 124 is illustrated as integrated into memory 112, but in some embodiments, database 124 may be provided as a separate storage module or may be provided as a cloud-based storage module. Additionally, or alternatively, database 124 may be a single database, or may be a distributed database implemented over a plurality of database modules.

Data compiler 121 may be configured to retrieve data related to car events associated with detectors, and to filter the data according to various configuration parameters for subsequent thresholding analysis (e.g., by threshold analysis manager 122). In some embodiments, data compiler 121 may include functionality to format and/or present car event data to an operator.

In embodiments, data compiler 121 may provide a robust mechanism for configuring, controlling, and executing data retrieval and compilation functionality in order to obtain a most appropriate set of car events and leverage the car event data to determine a status of a detector or detectors. For example, in embodiments, data compiler 121 may be configured to retrieve and compile the car event data by configuring and scheduling one or more analysis jobs that include configuration associated with the analysis job itself as well as the car event data against which thresholding analysis is to be performed.

In embodiments, configuring an analysis job may include specifying values for various parameters defining characteristics of the job as well as characteristics of the car events to be included in the thresholding analysis. In a sense, the configuration of an analysis job may serve to filter car events in the database so that data compiler 121 may compile those car events that meet the configuration (e.g., pass the filters). The resulting set of car events may be used in the thresholding analysis (e.g., performed by thresholding analysis manager 122) to determine a status of one or more detectors. For example, in embodiments, the various parameters defining characteristics of the job may include parameters for specifying attributes of the job, such as a schedule name, a starting time of the job, a minimum time period that the job should run, how often the job is to be scheduled (e.g., daily, weekly, monthly, etc.), how often the job is to recur (e.g., re-perform analysis of particular car events), etc. In embodiments, the various parameters defining characteristics of the car events to be included in the analysis may include parameters for specifying a detector for which car events are to be compiled (e.g., an identification of the detector), a minimum car event count, a type of precipitation associated with the car events, such as the precipitation status when the car event was recorded (e.g., dry, wet, rain, snow, rust, all, etc.), a maximum temperature at the time of the car event, a minimum temperature at the time of the car event, an indication of a time period that each task performing the analysis job may be available after completion, etc.

In some embodiments, data compiler 121 may be configured to provide a user interface (UI) via which an operator may specify values for the various configuration parameters of an analysis job. For example, data compiler 121 may present the UI (e.g., via user terminal 130) to the operator and may include various fields via which the operator may specify values for respective configuration parameters. In some embodiments, the values for the various configuration parameters of an analysis job may be automatically selected by data compiler 121, such as by retrieving values stored in database 124, which may be previously specified by an operator or may be default values.

In embodiments, scheduling an analysis job may include defining a period over which the analysis job may be executed, as well as the recursive configuration of the analysis job. In embodiments, an analysis job may be scheduled, which may make the analysis job available to be executed. The execution of the analysis job may be performed using tasks, in which case the job may be executed against a set of car events currently available via a task execution. In this manner, a task for an analysis job may execute the analysis job based on the analysis job configuration on car event data current available. In some embodiments, a second task may be started for the same analysis job, in which case the second task may execute the analysis job (e.g., in accordance with the analysis job configuration) against a set of car events as available with respect to the second task. In this manner, as car event data in the database changes (e.g., more data is collected), a task may permit the analysis job to be executed for the data as it changes. For example, an analysis job may be scheduled to be run weekly, in which case, every week, data compiler 121 may compile car events (e.g., from database 124) that meet the analysis job configuration into a task which is executed to perform the determination of the status of one or more detectors in the classification yard. This functionality may allow data retriever and compiler 121 to ensure that the analysis job for detector status determination may be performed recursively, and in this manner the results of a first iteration of the analysis job may be leveraged in a subsequent execution (e.g., via a second task). In addition, the use of tasks may also enable the analysis to be performed over different sets of car event data, which may facilitate a diverse thresholding analysis of the data.

In embodiments, the functionality of data compiler 121 to enable the configuration of analysis jobs may provide a mechanism to configure different analysis jobs with different sets of configuration parameter values, which may combine for a full deployment of configurations that may cover a large set of situations, conditions, and/or configurations. In some embodiments, data compiler 121 may include functionality to combine jobs, such as by defining a field for specifying that an analysis job is combinable. In embodiments, combining analysis jobs may include combining the results (e.g., detector status determination results) of the analysis jobs, such as for presentation to an operator for verification, confirmation, and/or corrective actions to address detector status results.

In embodiments, analysis jobs may include configuration that may enable car event data to be classified based on various factors. For example, a particular car event may be classified into a particular classification (e.g., a particular data bucket) based on environmental conditions (e.g., weather, etc.), train car type, bearing type of the train car, etc. In embodiments, the various classifications, or buckets, may include a cold bucket (e.g., that may be used to classify car events that occur during cold weather), a warm bucket (e.g., that may be used to classify car events that occur during warm weather), a hot bucket (e.g., that may be used to classify car events that occur during hot weather), a wet bucket (e.g., that may be used to classify car events that occur during wet weather), a snow bucket (e.g., that may be used to classify car events that occur during snowy weather), a rain bucket (e.g., that may be used to classify car events that occur during rainy weather), a dry bucket (e.g., that may be used to classify car events that occur during dry weather), a resilience type bucket (e.g., that may be used to classify car events based on whether the cut includes train cars with a resilience type bearing), etc. It will be appreciated that the description of the above data buckets that may be used to classify car events are provided for illustrative purposes and not by way of limitation. As such, additional and/or different data buckets may be used to classify car events.

In embodiments, an analysis job may be configured as corresponding to a particular data bucket (e.g., an analysis job may be configured to be used for determining status of detectors using car event data associated with a data bucket). In these embodiments, the results of the analysis jobs may be specifically tailored to the conditions associated with the particular data bucket with which the analysis job is configured. In this manner, this functionality to configure a job with a data bucket may enable system 100 to perform operations for determining a status of detectors in a classification yard in which the status determination is tailored for particular conditions (e.g., environmental conditions, train car type, bearing type of the train car, etc.). In embodiments, this functionality may allow system 100 to ensure that device status determinations are made based on prevailing conditions. For example, in some cases, some detectors may be known to operate inefficiently in cold weather, as compared with the efficiency of the detectors in warm weather. In this case, by tailoring the thresholding analysis to a particular prevailing condition, the results may take into account the currently prevailing conditions, which may prevent misidentification of detector status (e.g., a good detector may be labeled as bad during cold weather if the thresholding analysis does not take into account the cold weather conditions).

In embodiments, the configuration of the analysis job may specify the data bucket applicable to the analysis job. For example, an analysis job may be configured as applicable to the cold bucket. In this example, data compiler 121 may operate to compile a set of car events for thresholding analysis that includes car events that occur during cold weather. In this manner, the results of the thresholding analysis using the results of this analysis job may be specifically tailored to cold weather conditions. In another example, an analysis job may be configured as applicable to the dry bucket. In this example, data compiler 121 may operate to compile a set of car events for thresholding analysis that includes car events that occur during dry weather, such as car events occurring while no rain or snow was present. In this manner, the results of the thresholding analysis using the results of this analysis job may be specifically tailored to dry weather conditions. In yet another example, an analysis job may be configured as applicable to the dry and cold bucket. In this example, data compiler 121 may operate to compile a set of car events for thresholding analysis that includes car events that occur during dry and cold weather, such as car events occurring during cold weather while no rain or snow was present. In this manner, the results of the thresholding analysis using the results of this analysis job may be specifically tailored to dry and cold weather conditions. In still another example, an analysis job may be configured as applicable to a "resilience bearing true" bucket. In this example, data compiler 121 may operate to compile a set of car events for thresholding analysis that includes car events in which each cut generating each of the car events including one or more train cars having resilient bearing. In this manner, the results of the thresholding analysis using the results of this analysis job may be specifically tailored to reliance bearing conditions.

In some embodiments, current or recent car event data may include car event data associated with a particular data bucket representing currently prevailing conditions. For example, currently prevailing conditions may include cold weather (e.g., currently may be winter in the location of classification yard 140). In this case, the current and/or recent car event data in the database may include mostly, if not exclusively, cold weather car events (e.g., car events belonging to the cold data bucket) due to the currently prevailing weather conditions. In embodiments, analysis jobs that may executed to be used for thresholding analysis may include these mostly, if not exclusively, cold weather car events, which may result in detector status determination results (e.g., based on thresholding analysis) that may be biased and/or tailored to the prevailing weather conditions (e.g., cold weather conditions in this example).

Following the example above, if and when the weather changes to warmer conditions, a next car event (or a series of next car events) may be warm car events. In this case, it may be desirable to ensure that the thresholding analysis for determining a status of detectors may be tailored to the new warmer prevailing condition. However, as most of the previous car events may include cold weather car events, due the previously prevailing cold weather conditions, tuning the thresholding analysis for determining a status of detectors to the current warm weather conditions may be challenging, as the current data is biased to cold weather (e.g., previously prevailing condition). To address this, data compiler 121 may provide functionality to specify alternate data buckets into which car events may be classified. In embodiments, an analysis job may be configured with parameters that may specify a main data bucket and one or more alternate data buckets. In these embodiments, the analysis job may be executed against a set of car events that includes car events associated with the main data bucket. However, if no car events associated with the main data bucket exist in the database, or if less than a threshold number of car events associated with the main data bucket exist in the database, data retriever and compiler 121 may operate to include car events associated with the one or more alternate data buckets. For example, configuration of an analysis job may specify a warm bucket, with a cold bucket as alternative. However, the weather conditions recently change from cold to warm. As a result, there may be no or limited warm weather car events. In this case, the warm bucket analysis job still may be executed, but against a set of car events that may include cold weather car events. The results of the analysis job may be used to automatically tune the thresholding analysis for determining a status of detectors. This functionality to specify alternative data buckets for an analysis job may enable system 100 to provide a mechanism to leverage the benefits of the thresholding analysis for determining a status of detectors functionality of embodiments, even when the car event data may not be perfectly fit to the current prevailing conditions.

In embodiments, data compiler 121 may be configured to provide the compiled set of car events for a particular analysis job to thresholding analysis manager 122. In embodiments, each car event may be associated with a detector, may represent an event in which a cut passes through a detector, and may include information related to the actual speed and/or arrival time of the cut at the detector.

In embodiments, a flag may be provided in configuration for a detector that may be used to specify the status of the detector. For example, the flag may be used to indicate a "good status" for the detector indicating that the status of the detector is good, which may indicate that the detector is able to detect speeds and/or arrival times of a cut with an acceptable level of performance, a "bad status" for the detector indicating that the status of the detector is bad, which may indicate that the detector is not able to detect speeds and/or arrival times of a cut with an acceptable level of performance and may be fully or close to fully degraded, and/or a "warning status" indicating that the status of the detector is cautionary, and may indicate that although the detector is able to detect speeds and/or arrival times of a cut with an acceptable level of performance, the performance of the detector has degraded significantly and may be close to failing.

In embodiments, data compiler 121 may be configured to filter car events to be compiled based on the status flag of a detector. For example, data compiler 121 may determine whether the status flag of a detector has been reset from a "bad status" or "warning status" to a "good status." In response to a determination that the status flag of a detector has been reset from a "bad status" or "warning status" to a "good status," data compiler 121 may filter out any car events that occurred (e.g., with a timestamp) before the status flag of the detector was reset from the compiled set of car events to be provided to thresholding analysis manager 122. In this manner, the compiled set of car events to be provided to thresholding analysis manager 122 may include car events for detectors occurring from the time the status flag of the detector was reset to a current time. This functionality may allow system 100 to ensure that the thresholding analysis is iterative with respect to corrective actions. For example, system 100 may cause a corrective action to be applied to a detector determined to have a "bad status" or "warning status." After the corrective action, however, further thresholding analysis may be performed against the detector. In the case where the further thresholding analysis is performed on car events including the previous car events, the analysis may be biased toward a bad status finding. By resetting the set of car events that are considered in the determination of the status of a detector to include only car events after corrective action was taken on the detector, status results may be more reliable. In addition, resetting the set of car events that are considered in the determination of the status of a detector to include only car events after corrective action was taken on the detector may allow system 100 to determine whether a finding of a bad status detector may be actually caused by the prediction scheme (e.g., the prediction as to the expected measurements for a car event), rather than an actual bad status of the detector. In this case, if a detector is found to have a bad status numerous times after corrective action, system 100 may make a determination that the problem may be not that the detector is bad, but that the prediction scheme may be out of tune and not as accurate as should be.

In embodiments, data compiler 121 may be configured to calculate, based on the compiled set of car events, a speed difference for each car event in the compiled set of car events. In embodiments, data compiler 121 may calculate, for each car event in the compiled set of car events, a speed difference by calculating a difference between predicted speeds and actual speeds. For example, for a car event associated with a detector, data compiler 121 may subtract the predicted speed indicated in the car event from the actual (e.g., real-world) speed measured at the detector during car event. The result of the subtraction is the speed difference associated with the car event. Data compiler 121 may perform the same calculations for each car event in the compiled set of car events to obtain a speed difference for each car event in the compiled set of car events. The result may be a set of speed differences associated with the set of compiled set of car events, where each speed difference in the set of speed differences represents a difference between a predicted speed and an actual speed at a detector. In embodiments, a negative speed difference may indicate that the actual speed measured was lower than the predicted speed, and a positive speed difference may indicate that the actual speed measure was greater than the predicted speed. In embodiments, the set of speed differences may be stored in database 124 and/or may be provided to thresholding analysis manager 122.

In embodiments, data compiler 121 may be configured to generate a visual representation of the set of speed differences, and to present the generated visual representation to an operator. For example, in some embodiments, data compiler 121 may generate a box-and-whisker graph from the set of speed differences against the deviation represented by a speed difference from zero. In this case, a non-zero value for a speed difference may represent a deviation from zero, with zero indicating that there is no speed difference (e.g., the actual speed and the predicted speed in the car event are the same). In this example, a large deviation from zero may represent a car event in which the detector was not very accurate (e.g., the actual speed at the detector was far off from the predicted speed). On the other hand, a small deviation from zero, or a zero deviation, may represent a car event in which the detector was very accurate (e.g., the detected actual speed was very close or equal to the predicted speed).

Figure 2:
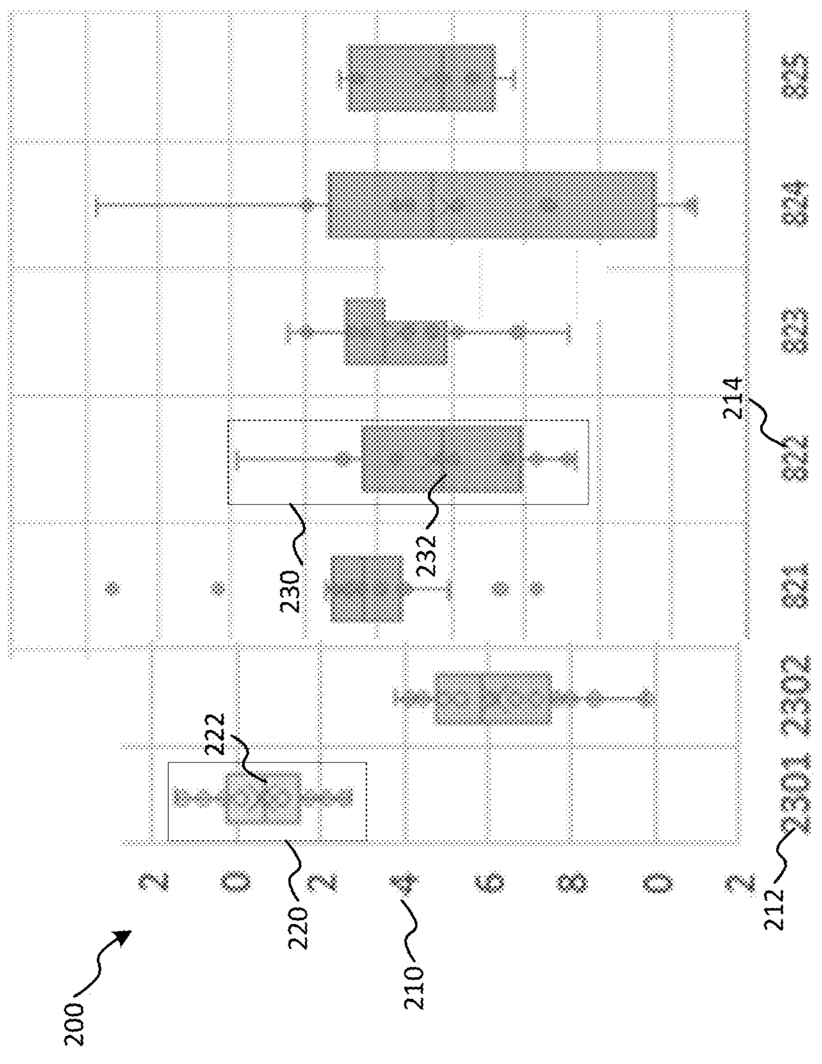
FIG. 2 shows an example of a box-and-whisker chart generated for a set of speed differences in accordance with embodiments of the present disclosure.

In embodiments, the box-and-whisker graph may then be presented to the operator using a UI (e.g., via user terminal device 130). FIG. 2 shows an example of a box-and-whisker chart 200 generated for a set of speed differences in accordance with embodiments of the present disclosure.

As seen in FIG. 2, data compiler 121 may generate a box-and-whisker entry for each detector represented in the compiled set of car events. In this manner, data compiler 121 may aggregate the speed differences in box-and-whisker chart 200 by detectors. For example, box-and-whisker entry 220 may correspond to detector 212, while box-and-whisker entry 230 may correspond to detector 214. In box-and-whisker 200, a density of each group of data points may be represented with lines, while higher density groups of data points may be represented marked with boxes within those lines. In this example, each speed difference (e.g., each speed difference calculated for each car event) is entered as a point in the appropriate box-and-whisker entry for the corresponding detector. For example, all speed differences calculated for all events associated with detector 212 may be entered as points in box-and-whisker entry 220. In this example, the speed differences for detector 212 may range from approximately 1.5 MPH speed differences to approximately-3 MPH speed differences. In this same example, all speed differences calculated for all events associated with detector 214 may be entered as points in box-and-whisker entry 230, and may range from approximately 0 MPH speed differences to approximately 8 MPH speed differences. In this example, the spread of the speed differences for detector 212 (e.g., approximately 4.5 MPH spread) seems to be tighter than the spread of the speed differences for detector 214 (e.g., approximately 8 MPH spread)

In embodiments, each box-and-whisker entry of box-and-whisker chart 200 may include an indication of the median value of the spread of each box-and-whisker entry. For example, for detector 212, the median value 222 of box-and-whisker entry 220 is approximately-1 MPH, which may indicate that many of the cuts passing through detector 212 had a speed approximately 1 MPH less than the predicted speed. In this same example, for detector 214, the median value 232 of box-and-whisker entry 230 is approximately-5 MPH, which may indicate that many of the cuts passing through detector 214 had a speed approximately 5 MPH less than the predicted speed, much farther off the predicted speed than detector 212.

In some embodiments, an operator presented with box-and-whisker chart 200 may gain insight into the operational performance of the detectors represented in box-and-whisker chart 200, and may even make maintenance decisions to ensure that corrective action is taken on detectors that may not be operating efficiently.

With reference back to FIG. 1, thresholding analysis manager 122 may be configured to applying thresholding analysis to the compiled set of car event data to determine a status of each detector represented in the compiled set of car event data. In particular, thresholding analysis manager 122 may perform thresholding analysis using the set of speed differences generated by data compiler 121, as described above. In embodiments, the thresholding analysis applied by manager 122 may include application of one or more rules to the data in the set of speed differences to determine the status of the detector indicated by the result of the application of the one or more rules In embodiments, a first set of rules may include speed differential rules that may be applied to speed differences associated with a detector. The speed differential rules may be applied to the set of speed differences generated by data compiler 121 and may be configured to determine the status of a detector based on the rule application.

In embodiments, a first speed differential rule may include a rule that determines that the status of a detector is good when no more than a threshold percentage of actual speed data points associated with the detector are outside of a plus or minus speed difference from a predicted speed. Put another way, the first speed differential rule determines that the status of a detector is good when no more than a threshold percentage of speed differences fall outside the range defined between +speed threshold and −speed threshold. In embodiments, thresholding analysis manager 122 may apply this first speed differential rule against the set of speed differences to determine, for each detector, the percentage of speed differences associated with each detector that outside the range defined between +speed threshold and −speed threshold. Thresholding analysis manager 122 may then compare the percentage of speed differences associated with each detector that outside the range defined between +speed threshold and −speed threshold with the threshold percentage. If, for a particular detector, the percentage of speed differences associated with each detector that outside the range defined between +speed threshold and −speed threshold is less than the threshold percentage, thresholding analysis manager 122 may determine that the particular detector has passed the first speed differential rule. On the other hand, if, for the particular detector, the percentage of speed differences associated with each detector that outside the range defined between +speed threshold and −speed threshold is not less than the threshold percentage, thresholding analysis manager 122 may determine that the particular detector has failed the first speed differential rule.

For example, a threshold percentage of 75% and a plus or minus speed threshold of 1 MPH may be specified for an application of the first speed differential rule. In this example, thresholding analysis manager 122 may determine, based on the set of speed differences, for a first detector, the percentage of speed differences associated with the first detector that are outside plus or minus 1 MPH. Thresholding analysis manager 122 may then compare the percentage of speed differences associated with the first detector that are outside of plus or minus 1 MPH with the threshold percentage of 75%. In this example, if the percentage of speed differences associated with the first detector that are outside of plus or minus 1 MPH is less than 75%, thresholding analysis manager 122 may determine that the first detector passed the first speed differential rule. However, if the percentage of speed differences associated with the first detector that are outside of plus or minus 1 MPH is not less than 75%, thresholding analysis manager 122 may determine that the first detector failed the first speed differential rule. Thresholding analysis manager 122 may continue applying the first speed differential rule to all detectors represented in the set of speed differences.

In embodiments, thresholding analysis manager 122 may apply the first speed differential rule to a detector with a parameter that ensures that the result of the application will be a percentage ratio between the percentage of speed differences associated with the detector that are outside of plus or minus the speed threshold and the parameters, such that the detector may be considered as a bad detector by thresholding analysis manager 122 when the percentage ratio is at least 100%. In these embodiments, the parameter may include a value by which the percentage of speed differences associated with the detector that are outside of plus or minus the speed threshold is divided. For example, thresholding analysis manager 122 may calculate the percentage of speed differences associated with the detector that are outside of plus or minus the speed threshold and may then divide the percentage by the parameter. The result may be a value configured to be 1 (or 100%) when the percentage of speed differences associated with the detector that are outside of plus or minus the speed threshold is above the threshold percentage. In embodiments, a detector may be determined to not fail the first differential rule, but the percentage ratio may be close to 100%, in which case, even though the detector may not be flagged as a bad detector, the detector may be flag as needing attention, as it may be close to becoming a bad detector. In this manner, thresholding analysis manager 122 may be configured to determine "how close" a detector may be to failing. In some embodiments a percentage ratio threshold may be used to determine to flag a detector as needing attention (e.g., a warning) even though the detector may not be flagged as a bad detector. In some embodiments, the percentage ratio threshold may be a value above 70% but less than 100%.

In embodiments, a second speed differential rule may include a rule that determines that the status of a detector is good when a median of the speed differences associated with the detector is not outside of a range defined by plus or minus an average threshold. In embodiments, thresholding analysis manager 122 may apply this second speed differential rule against the set of speed differences to determine, for each detector, the median of the speed differences associated with each detector. Thresholding analysis manager 122 may then compare the median of the speed differences associated with each detector with the range defined by plus or minus the average threshold. If, for a particular detector, the median of the speed differences associated with the particular detector is within the range defined by plus or minus the average threshold, thresholding analysis manager 122 may determine that the particular detector has passed the first speed differential rule. On the other hand, if, for the particular detector, the median of the speed differences associated with the particular detector is outside the range defined by plus or minus the average threshold, thresholding analysis manager 122 may determine that the particular detector has failed the second speed differential rule.

For example, an average threshold of 2 MPH may be specified for an application of the second speed differential rule. In this example, thresholding analysis manager 122 may determine, based on the set of speed differences, for a first detector, the median of the speed differences associated with the first detector. Thresholding analysis manager 122 may then compare the median of the speed differences associated with each detector with the range defined by plus or minus the average threshold of 2 MPH (e.g., [−2 MPH to 2 MPH]). In this example, if the median of the speed differences associated with the first detector is between −2 MPH and 2 MPH, thresholding analysis manager 122 may determine that the first detector passed the second speed differential rule. However, if the median of the speed differences associated with the first detector is outside of −2 MPH to 2 MPH, thresholding analysis manager 122 may determine that the first detector failed the second speed differential rule. Thresholding analysis manager 122 may continue applying the second speed differential rule to all detectors represented in the set of speed differences.

In embodiments, thresholding analysis manager 122 may apply the second speed differential rule to a detector with a parameter that ensures that the result of the application of the second speed differential rule will be a percentage ratio, such that the detector may be considered as a bad detector by thresholding analysis manager 122 when the percentage ratio is at least 100%. In embodiments, a detector may be determined to not fail the second differential rule, but the percentage ratio may be close to 100%, in which case, even though the detector may not be flagged as a bad detector, the detector may be flag as needing attention, as it may be close to becoming a bad detector. In this manner, thresholding analysis manager 122 may be configured to determine "how close" a detector may be to failing. In some embodiments a percentage ratio threshold may be used to determine to flag a detector as needing attention (e.g., a warning) even though the detector may not be flagged as a bad detector. In some embodiments, the percentage ratio threshold may be a value above 70% but less than 100%.

In embodiments, a third speed differential rule may include a rule that determines that the status of a detector is good when a defined middle percentage of the speed differences associated with the detector is not spread over a spread range greater than a spread threshold. In embodiments, the defined middle percentage may be defined as a threshold and may include a range of speed differences defined by a top percentile threshold and a bottom percentile threshold. For example, a defined middle percentage may include a range of 50% of the speed differences associated with the detector, and may be defined as the range excluding the bottom 25 percentile and the top 75 of data points. In embodiments, thresholding analysis manager 122 may apply this third speed differential rule against the set of speed differences to determine, for each detector, the spread range of the defined middle percentage of speed differences associated with each detector. For example, thresholding analysis manager 122 may determine, for each detector, the difference between the lowest speed difference value in the speed differences within the defined middle percentage and the highest speed difference value in the speed differences within the defined middle percentage to determine the spread range of the defined middle percentage of speed differences associated with each detector. Thresholding analysis manager 122 may then compare the spread range of the defined middle percentage of speed differences associated with each detector with the spread threshold. If, for a particular detector, the spread range of the defined middle percentage of speed differences associated with each detector is less than the spread threshold, thresholding analysis manager 122 may determine that the particular detector has passed the third speed differential rule. On the other hand, if, for the particular detector, the spread range of the defined middle percentage of speed differences associated with each detector is not less than the spread threshold, thresholding analysis manager 122 may determine that the particular detector has failed the third speed differential rule.

For example, a spread threshold of 3 MPH may be specified for the third speed differential rule. In addition, a middle percentage that includes the bottom 25% and the top 75% of data points may be defined for the third speed differential rule. In embodiments, thresholding analysis manager 122 may apply this third speed differential rule against the set of speed differences and may identify speed differences associated with a detector falling within the middle percentage of all the speed differences associated with the detector. Analysis manager 122 may then determine a spread range of the speed differences within the middle percentage. For example, thresholding analysis manager 122 may determine the difference between the lowest speed difference value within the middle percentage and the highest speed difference value within the defined middle percentage. Analysis manager 122 may determine the spread range of the middle percentage as the difference between the highest speed difference value and the lowest speed difference value. In this example, thresholding analysis manager 122 may compare the spread range of the middle percentage to the spread threshold of 3 MPH. In this example, if the spread range of the middle percentage is less than the spread threshold of 3 MPH, thresholding analysis manager 122 may determine that the first detector passed the third speed differential rule. However, if the spread range of the middle percentage is not less than the spread threshold of 3 MPH, thresholding analysis manager 122 may determine that the first detector failed the third speed differential rule. Thresholding analysis manager 122 may continue applying the third speed differential rule to all detectors represented in the set of speed differences.

In embodiments, thresholding analysis manager 122 may apply the third speed differential rule to a detector with a parameter that ensures that the result of the application of the third speed differential rule will be a percentage ratio, such that the detector may be considered as a bad detector by thresholding analysis manager 122 when the percentage ratio is at least 100%. In embodiments, a detector may be determined to not fail the third speed differential rule, but the percentage ratio may be close to 100%, in which case, even though the detector may not be flagged as a bad detector, the detector may be flag as needing attention, as it may be close to becoming a bad detector. In this manner, thresholding analysis manager 122 may be configured to determine "how close" a detector may be to failing. In some embodiments a percentage ratio threshold may be used to determine to flag a detector as needing attention (e.g., a warning) even though the detector may not be flagged as a bad detector. In some embodiments, the percentage ratio threshold may be a value above 70% but less than 100%.

In embodiments, a fourth speed differential rule may include a weighted combination of the first, second, and third speed differential rules. In embodiments, thresholding analysis manager 122 may apply the fourth rule by combining the results of the first, second, and third speed differential rules in a weighted combination. The weighted combination may include applying a respective multiplier to the results of each of the first, second, and third speed differential rules. For example, weighted factors of 3, 2, and 2.25 may be configured for the results of the first, second, and third speed differential rules, respectively. In this example, thresholding analysis manager 122 may apply the respective weighted factor to each of the first, second, and third speed differential rules and may then sum the results to obtain a single result for the combination rule. In embodiments, applying the respective weighted factor to each of the first, second, and third speed differential rules may include raising each of the of the first, second, and third speed differential rules results by a power equal to the respective weighted factors. For example, in this example, the results of the first rule may be raised to a power of 3, the results of the second rule may be raised to a power of 2, and the results of the third rule may be raised to a power of 2.5. In this example, the results of each exponential operation may be summed to obtain an overall result for the fourth rule. In some embodiments, as the results of the first, second, and third speed differential rules may include a percentage value, the result of the combination rule (e.g., fourth speed differential rule) may also be a percentage value. It is noted that the particular weighted factors of 3, 2, and 2.25 are described by way of example and not intended to be limiting in any way. Indeed, in some embodiments, other weighted factors may be used. For example, in another particular example, weighted factors of 2, 3, and 1.1 may be configured for the results of the first, second, and third differential rules, respectively.

In embodiments, thresholding analysis manager 122 may determine a status of a detector based on whether the detector failed or passed each of differential speed rules. For example, if a detector failed any of the differential speed rules, the status of the detector may be set as bad. On the other hand, if the detector passed all applied differential speed rules, the status of the detector may be set as good. In particular embodiments, a detector may fail the fourth speed differential rule (e.g., the combination rule) if the detector has not failed any one of the individual rules in the combination.

Results manager 123 may be configured to report the results of the thresholding analysis by thresholding analysis manager 122 and to generate, track, and/or control corrective actions performed in response to the determination of the status of detectors. For example, in some embodiments, results manager 123 may be configured to automatically generate a corrective action without operator intervention. In embodiments, results manager 123 may issue a notification to operators of the status of a detector, in which case the operators may take corrective action. In some embodiments, results manager 123 may, in response to a determination that the status of a detector is bad, send a control signal to the deactivate the detector in order to avoid potential damage.

In embodiments, results manager 123 may be configured to generate and provide one or more status reports indicating the determined status of one or more detectors based on the thresholding analysis by thresholding analysis manager 122. In embodiments, the status report may be interactive and may allow an operator to modify entries on the report. Modified entries in the report may be detected by results manager 123, which may cause results manager 123 to store the modified entries in the respective configurations of the corresponding detector. For example, in some embodiments, an operator may reset a status indicator flag of a detector (e.g., after corrective action has been taken on the detector) from a bad detector or a section warning status indicator to a good detector status indicator. In these cases, the configuration of the corresponding detector may include an indication that the status flag for the detector has been reset. In embodiments, car events associated with the detector having a timestamp with a value before the time the status flag was reset may be scrubbed or removed from the database. In this manner, subsequent thresholding analysis performed for the detector may only include car events after the status flag reset. The same process of removing car events associated with a detector occurring prior to a status flag reset for the detector may be performed every time the status flag for the detector is reset. However, in embodiments, results manager 123 may determine that the status flag of a detector found in a current thresholding analysis iteration to be a bad detector or having a section warning has been reset a number of times before, and that the number of times exceeds a threshold number of times. In this case, results manager 123 may determine to include an indication indicating that there is a likelihood that the detector is not actually bad, even though it has been found to be bad in the current thresholding analysis iteration, and there may be a possibility that the problem (e.g., the cause of the detector being found to be a bad detector) may be another device (e.g., a detector used to collect speed information associated with the detector) or the prediction scheme used to determine the expected speeds at the detector.

Figure 3:
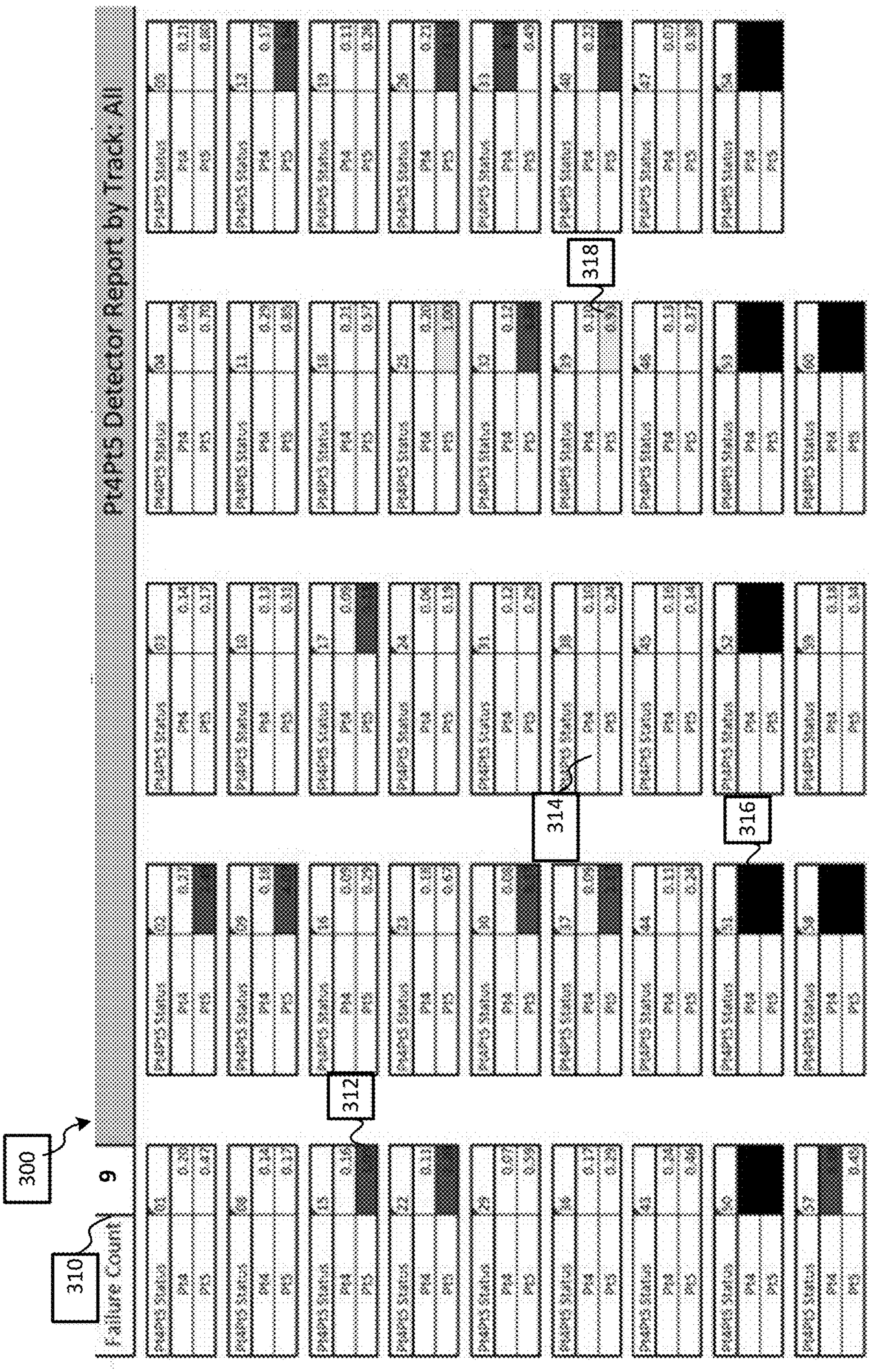
FIG. 3 illustrates an example of a user interface presented to an operator to provide a status report associated with one or more detectors in accordance with aspects of the present disclosure.

FIG. 3 illustrates an example of a UI presented to an operator to provide a status report associated with one or more detectors in accordance with aspects of the present disclosure. As can be seen in FIG. 3, UI 300 may be presented to an operator (e.g., via user terminal 130). In embodiments, UI 300 may include various graphical elements providing input/output functionality so that the operator may be presented with the results of the detector status determination and may interact with system 100 such that feedback may be provided by the operator.

In embodiments, UI 300 may include a section 310 for including an indication of the number of detector failures (e.g., the number of detectors whose status was determined as bad) included in the report.

As illustrated in FIG. 3, the report presented in FIG. 3 may identify several detectors as bad. For example, in this example, rules were applied against detector 312, and the result was 105%, indicating that detector 312 is bad. In this example, the rules were applied against detector 318, and the result was 93%, not greater than 100%, indicating that although detector 312 is not bad, it is degraded and may be close to becoming a bad detector. In this example, rules were against detector 14, and the result of the detector was 10%, indicating that the detector is good. It is noted that, no results were obtained for detector 316.

It is also note that the report presented in FIG. 3 may be interactive and may allow an operator to change (e.g., reset) the status indication flags of the bad detectors after corrective action has been taken on the detectors.

Figure 4:
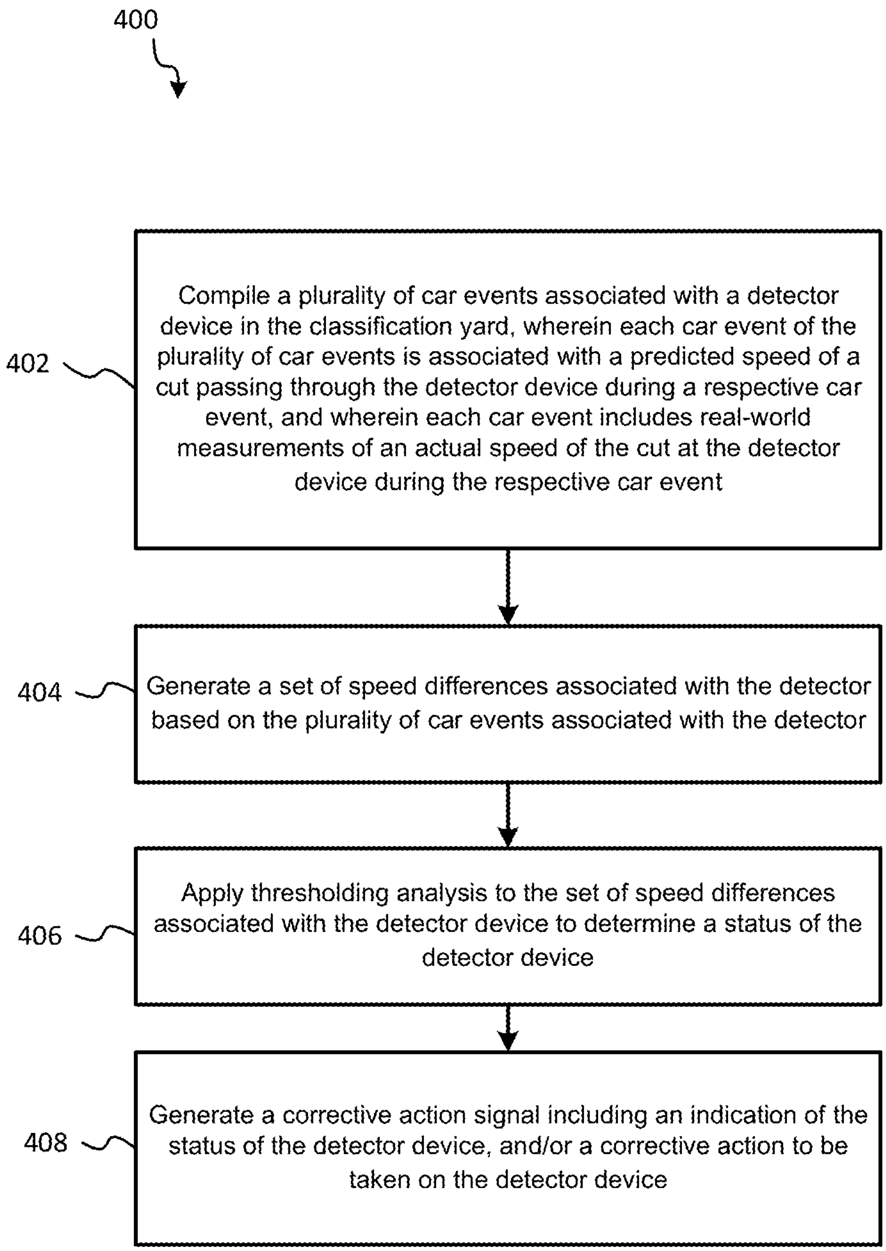
FIG. 4 shows a high-level flow diagram of operation of a system for determining a status of detector devices in a classification yard in accordance with embodiments of the present disclosure.

FIG. 4 shows a high-level flow diagram 400 of operation of a system configured in accordance with embodiments of the present disclosure for determining a status of detectors in a classification yard. For example, the functions illustrated in the example blocks shown in FIG. 4 may be performed by system 100 of FIG. 1 according to embodiments herein. In embodiments, the operations of the method 400 may be stored as instructions that, when executed by one or more processors, cause the one or more processors to perform the operations of the method 400.

At block 402, a plurality of car events associated with a detector device in the classification yard is compiled. In embodiments, each car event of the plurality of car events may be associated with a predicted speed of a cut passing through the detector device during a respective car event, and each car event may include real-world measurements of an actual speed of the cut at the detector device during the respective car event. In embodiment, functionality of a data compiler (e.g., data compiler 121 in FIG. 1) may be used to compile the plurality of car events associated with a detector device in the classification yard. In embodiments, the data compiler may perform operations to compile the plurality of car events associated with a detector device in the classification yard according to operations and functionality as described above with reference to data compiler 121 and as illustrated in FIGS. 1-3.

At block 404, a set of speed differences associated with the detector is generated based on the plurality of car events associated with the detector. In embodiment, functionality of a data compiler (e.g., data compiler 121 in FIG. 1) may be used to generate the set of speed differences associated with the detector based on the plurality of car events associated with the detector. In embodiments, the data compiler may perform operations to generate the set of speed differences associated with the detector based on the plurality of car events associated with the detector according to operations and functionality as described above with reference to data compiler 121 and as illustrated in FIGS. 1-3.

At block 406, thresholding analysis is applied to the set of speed differences associated with the detector to determine a status of the detector. In embodiment, functionality of a threshold analysis manager (e.g., threshold analysis manager 122 in FIG. 1) may be used to apply thresholding analysis to the set of speed differences associated with the detector to determine a status of the detector. In embodiments, the threshold analysis manager may perform operations to apply thresholding analysis to the set of speed differences associated with the detector to determine a status of the detector according to operations and functionality as described above with reference to threshold analysis manager 122 and as illustrated in FIGS. 1-3.

At block 408, a corrective action signal including an indication of the status of the detector and/or a corrective action to be taken for the detector is generated. In embodiment, functionality of a results manager (e.g., results manager 123 in FIG. 1) may be used to generate a corrective action signal including an indication of the status of the detector and/or a corrective action to be taken for the detector. In embodiments, the results manager may perform operations to generate a corrective action signal including an indication of the status of the detector and/or a corrective action to be taken for the detector according to operations and functionality as described above with reference to results manager 123 and as illustrated in FIG. 1.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, detectors, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining a status of detectors in a classification yard, comprising:

compiling a plurality of car events associated with a detector device in the classification yard, wherein each car event of the plurality of car events is associated with a predicted speed of a cut passing through the detector device during a respective car event, and wherein each car event includes real-world measurements of an actual speed of the cut at the detector device during the respective car event;

generating a set of speed differences associated with the detector based on the plurality of car events associated with the detector, wherein generating the set of speed differences associated with the detector includes:

calculating, for each car event in the plurality of car events associated with a detector, a speed difference by calculating a difference between the predicted speed of the cut passing through the detector device during the respective car event and the actual speed of the cut at the detector device during the respective car event; and aggregating each calculated speed difference for each car event into the set of speed differences associated with the detector;

applying thresholding analysis to the set of speed differences associated with the detector to determine a status of the detector; and generating a corrective action signal including an automatic control signal to one or more of deactivate the detector and adjust the detector.

2. The method of claim 1, wherein applying thresholding analysis to the set of speed differences associated with the detector includes applying one or more of a set of differential speed rules to the set of speed differences associated with the detector, wherein the set of differential rules includes one or more of:

a first speed differential rule specifying that the status of the retarder device is based on whether a threshold percentage of the set of speed differences associated with the detector is outside of a range defined by plus or minus a speed threshold;

a second speed rule specifying that the status of the retarder device is based on whether a median or average of the set of speed differences associated with the detector is within a range defined by plus or minus an average threshold;

a third speed differential rule specifying that the status of the retarder device is based on whether a spread range of speed differences values within a middle percentage of the set of speed differences associated with the detector is less than a spread threshold, wherein the middle percentage of the set of speed differences is defined by a range of speed differences values including a top percentile threshold of the speed differences values in the set of speed differences and a bottom percentile threshold of the speed differences values in the set of speed differences; and a combination speed differential rule that includes a weighted combination of the results of one or more of the first speed differential rule, the second speed differential rule, and the third speed differential rule.

3. The method of claim 1, wherein applying the thresholding analysis to the set of speed differences associated with the detector to determine the status of the detector includes:

obtaining a percentage result for the detector, the percentage result indicating a percentage status of the detector.

4. The method of claim 3, wherein determining the status of the detector includes flagging a status flag of the detector with one or more of:

a bad status indication when the percentage status of the detector is at least 100%;

a warning status indication when the percentage status of the detector is greater than a threshold percentage and less than 100%; and a good status indication when the percentage status of the detector is less than the threshold percentage.

5. The method of claim 4, wherein the warning status indication includes a section warning indication identifying a section of the detector determined to have failed the thresholding analysis.

6. The method of claim 1, further comprising:

identifying that the indication of the status of the detector found to be bad has previously been reset a number of times;

determining that the number of times exceeds a threshold amount; and flagging the detector as a potential misidentification of a bad detector.

7. A system for determining a status of detector devices in a classification yard, comprising:

at least one processor; and a memory operably coupled to the at least one processor and storing processor-readable code that, when executed by the at least one processor, is configured to perform operations including:

compiling a plurality of car events associated with a detector device in the classification yard, wherein each car event of the plurality of car events is associated with a predicted speed of a cut passing through the detector device during a respective car event, and wherein each car event includes real-world measurements of an actual speed of the cut at the detector device during the respective car event;

generating a set of speed differences associated with the detector based on the plurality of car events associated with the detector, wherein generating the set of speed differences associated with the detector includes:

calculating, for each car event in the plurality of car events associated with a detector, a speed difference by calculating a difference between the predicted speed of the cut passing through the detector device during the respective car event and the actual speed of the cut at the detector device during the respective car event; and aggregating each calculated speed difference for each car event into the set of speed differences associated with the detector;

applying thresholding analysis to the set of speed differences associated with the detector to determine a status of the detector; and generating a corrective action signal including an automatic control signal to one or more of deactivate the detector and adjust the detector.

8. The system of claim 7, wherein applying thresholding analysis to the set of speed differences associated with the detector includes applying one or more of a set of differential speed rules to the set of speed differences associated with the detector, wherein the set of differential rules includes one or more of:

a first speed differential rule specifying that the status of the retarder device is based on whether a threshold percentage of the set of speed differences associated with the detector is outside of a range defined by plus or minus a speed threshold;

a second speed rule specifying that the status of the retarder device is based on whether a median or average of the set of speed differences associated with the detector is within a range defined by plus or minus an average threshold;

a third speed differential rule specifying that the status of the retarder device is based on whether a spread range of speed differences values within a middle percentage of the set of speed differences associated with the detector is less than a spread threshold, wherein the middle percentage of the set of speed differences is defined by a range of speed differences values including a top percentile threshold of the speed differences values in the set of speed differences and a bottom percentile threshold of the speed differences values in the set of speed differences; and a combination speed differential rule that includes a weighted combination of the results of one or more of the first speed differential rule, the second speed differential rule, and the third speed differential rule.

9. The system of claim 7, wherein applying the thresholding analysis to the set of speed differences associated with the detector to determine the status of the detector includes:

obtaining a percentage result for the detector, the percentage result indicating a percentage status of the detector.

10. The system of claim 9, wherein determining the status of the detector includes flagging a status flag of the detector with one or more of:

a bad status indication when the percentage status of the detector is at least 100%;

a warning status indication when the percentage status of the detector is greater than a threshold percentage and less than 100%; and a good status indication when the percentage status of the detector is less than the threshold percentage.

11. The system of claim 10, wherein the warning status indication includes a section warning indication identifying a section of the detector determined to have failed the thresholding analysis.

12. The system of claim 7, further comprising:

identifying that the indication of the status of the detector found to be bad has previously been reset a number of times;

determining that the number of times exceeds a threshold amount; and flagging the detector as a potential misidentification of a bad detector.

13. A computer-based tool for determining a status of detector devices in a classification yard, the computer-based tool including non-transitory computer readable media having stored thereon computer code which, when executed by a processor, causes a computing device to perform operations comprising:

compiling a plurality of car events associated with a detector device in the classification yard, wherein each car event of the plurality of car events is associated with a predicted speed of a cut passing through the detector device during a respective car event, and wherein each car event includes real-world measurements of an actual speed of the cut at the detector device during the respective car event;

generating a set of speed differences associated with the detector based on the plurality of car events associated with the detector, wherein generating the set of speed differences associated with the detector includes:

calculating, for each car event in the plurality of car events associated with a detector, a speed difference by calculating a difference between the predicted speed of the cut passing through the detector device during the respective car event and the actual speed of the cut at the detector device during the respective car event; and aggregating each calculated speed difference for each car event into the set of speed differences associated with the detector;

applying thresholding analysis to the set of speed differences associated with the detector to determine a status of the detector; and generating a corrective action signal including an automatic control signal to one or more of deactivate the detector and adjust the detector.

14. The computer-based tool of claim 13, wherein applying thresholding analysis to the set of speed differences associated with the detector includes applying one or more of a set of differential speed rules to the set of speed differences associated with the detector, wherein the set of differential rules includes one or more of:

a first speed differential rule specifying that the status of the retarder device is based on whether a threshold percentage of the set of speed differences associated with the detector is outside of a range defined by plus or minus a speed threshold;

a second speed rule specifying that the status of the retarder device is based on whether a median or average of the set of speed differences associated with the detector is within a range defined by plus or minus an average threshold;

a third speed differential rule specifying that the status of the retarder device is based on whether a spread range of speed differences values within a middle percentage of the set of speed differences associated with the detector is less than a spread threshold, wherein the middle percentage of the set of speed differences is defined by a range of speed differences values including a top percentile threshold of the speed differences values in the set of speed differences and a bottom percentile threshold of the speed differences values in the set of speed differences; and a combination speed differential rule that includes a weighted combination of the results of one or more of the first speed differential rule, the second speed differential rule, and the third speed differential rule.

15. The computer-based tool of claim 13, wherein applying the thresholding analysis to the set of speed differences associated with the detector to determine the status of the detector includes:

obtaining a percentage result for the detector, the percentage result indicating a percentage status of the detector.

16. The computer-based tool of claim 15, wherein determining the status of the detector includes flagging a status flag of the detector with one or more of:

a bad status indication when the percentage status of the detector is at least 100%;

a warning status indication when the percentage status of the detector is greater than a threshold percentage and less than 100%; and a good status indication when the percentage status of the detector is less than the threshold percentage.

17. The computer-based tool of claim 13, further comprising:

identifying that the indication of the status of the detector found to be bad has previously been reset a number of times;

determining that the number of times exceeds a threshold amount; and flagging the detector as a potential misidentification of a bad detector.

* * * * *